United States Patent [19]

Buckholz, Jr. et al.

[11] Patent Number: 4,942,047

[45] Date of Patent: Jul. 17, 1990

[54] PROCESS FOR PREPARING MARINADED PROTEINACEOUS PRODUCT AND PRODUCT PRODUCED THEREBY

[75] Inventors: Lawrence L. Buckholz, Jr., Middletown; Robin Kasper-Lehmann, Elberon, both of N.J.

[73] Assignee: International Flavors & Fragrances Inc., New York, N.Y.

[21] Appl. No.: 457,162

[22] Filed: Dec. 26, 1989

Related U.S. Application Data

[63] Continuation-in-part of Ser. No. 371,074, Jun. 26, 1989, abandoned, which is a continuation-in-part of Ser. No. 114,057, Oct. 29, 1987, abandoned.

[51] Int. Cl.$^5$ .......................... A23L 1/31; A23L 1/315
[52] U.S. Cl. ..................................... 426/302; 426/533; 426/589; 426/641; 426/644
[58] Field of Search ............... 426/281, 302, 533, 589, 426/641, 643, 644, 650, 652, 656

[56] References Cited

U.S. PATENT DOCUMENTS

| | | | |
|---|---|---|---|
| 3,394,016 | 7/1968 | Bidmead et al. | 426/533 |
| 3,552,978 | 1/1971 | Inklaar | 426/281 |
| 3,681,095 | 8/1972 | Inklaar | 426/281 |
| 3,695,892 | 10/1973 | Reinke | 426/281 |
| 4,081,565 | 3/1978 | Chhuy et al. | 426/533 |
| 4,514,431 | 4/1985 | Buckholz et al. | 426/641 |

*Primary Examiner*—Arthur L. Corbin
*Attorney, Agent, or Firm*—Arthur L. Liberman

[57] ABSTRACT

Described is a process for producing a marinaded proteinaceous product such as marinaded chicken meat whereby the resulting product has a savory flavor such as a teriyaki flavor, comprising the steps of:

(a) providing a chicken meat food core;
(b) preparing a mixture of:
  (i) an inorganic phosphate salt;
  (ii) water; and
  (iii) a reaction flavor which is a reaction product of cysteine hydrochloride, thiamine hydrochloride and macerated chicken meat;
(c) coating the mixture of (b) onto the surface of the chicken meat of (a) and keeping the coating on the chicken meat for such a period of time as to cause the chicken meat to permanently absorb or adsorb the flavor composition of (b); and
(d) cooking the resulting product.

7 Claims, No Drawings

PROCESS FOR PREPARING MARINADED PROTEINACEOUS PRODUCT AND PRODUCT PRODUCED THEREBY

PRIOR RELATED PATENT APPLICATIONS

This application is a continuation-in-part of application for U.S. Letters Patent, Ser. No. 371,074 filed on June 26, 1989, now abandoned, which, in turn, is a continuation-in-part of application for U.S. Letters Patent, Ser. No. 114,057 filed on Oct. 29, 1987, now abandoned.

BACKGROUND OF THE INVENTION

Our invention concerns the production of a marinaded proteinaceous foodstuff using a novel marinade composition of matter enabling permanent absorption of flavor precursors and/or reaction flavor compositions into a proteinaceous inner food core prior to cooking the resulting marinaded food product.

The art of using marinades is well known. Thus, the publication "Chicken Breasts", Diane Rozas published by Harmony Books/New York, 1985 sets forth on page 11 thereof:

"Marinades: There are two types of marinades, wet and dry. Wet marinades include enough liquid to partially immerse chicken breasts before cooking and later are also used as basting sauces. Dry marinades usually include a combination of herbs and spices and perhaps a small amount of oil, which is rubbed into the chicken. After combining the marinade ingredients with the chicken breast, allow enough time for the flavors to penetrate. Luckily, chicken breasts absorb flavors quickly: 1 t 4 hours at room temperature. Some wet marinades, such as those with lemon juice or wine, also act as tenderizers. Liqueurs impart strong flavors, so use them sparingly."

At page 49 of the Rozas textbook a "Chinese Marinade" is indicated to be capable of being prepared for chicken, thusly:

"Enough for 2 pounds of chicken breasts
 3 tablespoons soy sauce
 2 tablespoons honey
 2 tablespoons hoisin sauce
 2 tablespoons white wine vinegar
 2 tablespoons rice wine or pale dry sherry
 1 teaspoon crushed garlic
 1 teaspoon minced ginger root
 1 teaspoon sugar
 2 tablespoons chicken stock
 2 tablespoons Chinese plum sauce (available in Oriental markets)
Marinate chicken breasts in the above ingredients for at least 2 hours before grilling or broiling."

At page 54 of the Rozas textbook, "Tandoori Chicken" using marinade is indicated to be prepared, thusly:

4–6 servings
3 whole chicken breasts (about 3 pounds), halved
¼ cup plus 2 tablespoons fresh lemon juice
1 teaspoon salt
½ teaspoon powdered saffron (or 2 saffron threads, minced)
2 teaspoons crushed coriander seeds
¼ teaspoon dried red pepper flakes
1 teaspoon cumin
2 large garlic cloves, coarsely chopped
1 teaspoon finely chopped ginger
1 cup plain yogurt
4 tablespoons (½ stick) butter 1. Prick the chicken breasts all over with a fork several times so the marinade can penetrate the breast meat.
2. Arrange the chicken breasts in a single layer in a shallow glass or ceramic dish.
3. In a bowl, combine ⅓ cup of the lemon juice, salt, and saffron. With your hands, rub this mixture into the chicken breasts.
4. In a small skillet over medium heat, toast the coriander seeds, red pepper flakes, and cumin for about 2 minutes, stirring constantly. Place in a food processor; add the garlic, ginger, and 4 tablespoons of the yogurt, and blend for 30 seconds. Add the remaining yogurt, mix well, and pour over the chicken breasts. Cover tightly and marinate at room temperature for at least 12 hours (or 24 hours in the refrigerator), turning the breasts several times.
5. Prepare the grill or heat the broiler. In a small saucepan over medium heat, melt the butter. Remove the chicken from the marinade and drain off the excess. Baste the chicken breasts with the butter and grill 7 to 9 inches from the hot coals for 4 to 5 minutes on each side, starting with the bone side toward the heat.
6. When the chicken breasts are done, sprinkle with the remaining 2 tablespoons of lemon juice.

At page 55 of the Rozas textbook "Red Wine Marinade"—is indicated to be prepared, thusly:

2–4 servings
2 whole chicken breasts (about 2 pounds), halved
Salt and black pepper to taste Marinade ¼ cup olive oil
2 medium onions, chopped
1 cup tomato purée
1 teaspoon dried basil (or 1 tablespoon finely chopped fresh basil)
⅓ cup honey
¼ cup chicken stock
3 tablespoons Worcestershire sauce
1 teaspoon dry mustard
1 cup Italian dry red wine 1. Sprinkle the chicken breasts with salt and pepper.
2. In a heavy skillet over medium heat, heat the olive oil. Sauté the onions until soft. Add the tomato purée, basil, honey, stock, Worcestershire sauce, and mustard; mix together well. Reduce the heat to low and simmer for 15 minutes. Add the wine in the last minute of cooking and heat through. Let cool to room temperature.
3. Arrange the chicken breast pieces in a single layer in a shallow glass or ceramic dish; pour on the marinade and let stand at room temperature for 3 hours, turning several times to coat well.
4. Prepare the grill or heat the broiler. Beginning bone side down, cook the chicken breasts 7 to 9 inches from the coals for 4 to 5 minutes on each side, basting several times.

At page 90 of the Rozas textbook a "Vegetable Marinade" is indicated to be useful for chicken breasts, thusly:

Vegetable Marinade

⅓ cup olive oil
¼ cup white wine vinegar
2 tablespoons sherry wine vinegar
Salt and black pepper to taste
6 whole large red cabbage leaves
1 bunch large fresh spinach leaves, washed and stems removed
1 pound small tube pasta, such as penne or ziti cooked until el donie, rinsed, drained, and chilled
2 scallions (white and green parts), minced
½ pound cherry tomatoes 1. In a large saucepan or stockpot, bring the stock to a boil; stir in the salt and pepper. Add the chicken breasts, arrange in a single layer, and cover. Lower the heat and simmer 8 to 10 minutes, or until firm. Remove from the heat, uncover, and let cool in the stock. Remove the skin and bones. Cut the chicken breasts into bite-size pieces. Transfer to a large bowl and add the oil, vinegar, garlic, and scallions. Toss gently; refrigerate, covered, until you are ready to assemble the salad.
2. Mix the vegetables with the marinade ingredients. Toss, cover, and refrigerate.
3. To prepare the serving platter, ring the outer edge with the large cabbage leaves. In the center, create a bed for the chicken breast mixture using the spinach leaves. At the last minute, toss the pasta and the vegetables together. Place on the platter, leaving a well in the center for the chicken. Place the chicken in the well, sprinkle with scallions, and decorate the platter with cherry tomatoes. Keep refrigerated until serving time.

Duxbury, Food Processing, June 1987, at page 131 and 132 (title: "Marinade/flavor/coating system for further processed poultry (Poultry Show attendees like new tastes and 'added value')" discloses:

". . . A combination marinade/flavor/glaze coating system developed from marinated or pumped chicken and turkey meats offered samplers an array of traditional international flavors (Cajun—a down home bayou flavor; Sate—an Indonesian peanut sauce; Tandoori—a punjabi grilled meat seasoning typical of East Indian Toonduri (clay pot) cooking). Other flavored glaze seasonings suggested and available for marinated meats include a hot and spicy Oriental, Mexican, Italian and traditional barbecues.

Process/consumer benefits

Marinating further processed poultry products with a marinade and flavor glaze coating system offers processors a number of benefits. The marinade/pump solution has a tenderizing affect which yields a naturally juicy and succulent meat flavor in the product. Finished yield is improved by the pickup weight added to refrigerated or frozen product—and this reduces the cookout losses to the consumer.

If the product is processed and marketed as a precooked item, the marinade solution will compensate for all or part of the processor cooking losses (depending on frying temperature and time and on percent of pump pickup). Precooked products offer further added value to consumers in the form of convenience and ease of preparation . . . Preparation of the marinated meat for application of the flavored glazed coating includes tempering to 28° F. and either immersing or coating the meat surfaces with a liquified (110° F.) butter-flavored hydrogenated shortening (or an alternative clarified butter or margarine). . . "

Rockland, et al, U.S. Pat. No. 4,159,351, discloses the preparation of mixed bean salads. The beans are shown to be treated with a processing composition which includes a phosphate (see the Table at the top of column 4). Following treatment with the processing solution, the beans are immersed in a marinade which can contain salt and a flavoring component. No phosphate is specifically introduced into the marinade.

Cheng, U.S. Pat. No. 4,683,139, discloses a method for the preparation of fresh meat involving treating the meat with a solution containing a phosphate compound, a sodium or potassium salt of an organic acid and another acid or salt thereof.

Trenkle, U.S. Pat. Nos. 4,253,332 and 4,284,654 disclose an example showing marination of beets. The compositions are disclosed as containing a large number of possible components including salt and a phosphate. This is specifically set forth at columns 19 and 20 of U.S. Pat. No. 4,250,331.

Nothing in the prior art, however, discloses the use of such reaction flavors as those set forth in the following U.S. Letters Patent taken in conjunction with a phosphate for purposes of marinading proteinaceous inner food cores:

U.S. Pat. No. 4,076,852 issued on Feb. 28, 1978; and
U.S. Pat. No. 4,081,565 issued on Mar. 28, 1978.

The disclosure of the foregoing patents are incorporated herein by reference.

SUMMARY OF THE INVENTION

Our invention concerns a process for producing a marinaded proteinaceous product comprising the steps of:
(a) providing a proteinaceous inner food core having a first outer surface (for example, chicken muscle tissue, beef muscle tissue, cubed chicken, pork loin, pork cutlet, beef muscle tissue, ground turkey and the like);
(b) preparing a mixture of:
  (i) an inorganic non-toxic phosphate salt (e.g., sodium tripolyphosphate);
  (ii) water;
  (iii) a reaction flavor or mixture of reaction flavor precursors formed by intimately admixing;
    1. 30–80% meat (e.g., macerated chicken meat and/or beef taken alone or further together with a meat extract such as commercial beef extract);
    2. 0.1–1.5% cysteine or a salt thereof (e.g., cysteine hydrochloride);
    3. 0.2–1.5% thiamine or a salt thereof (e.g., thiamine hydrochloride);
    4. 2–30% of a polysaccharide, e.g., starch and/or sugar(s) or a reducing sugar metabolite such as a furanone of the genus:

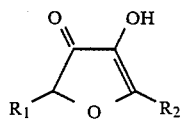

wherein $R_1$ and $R_2$ are the same or different hydrogen or $C_1-C_2$ lower alkyl with at least one of $R_1$ and $R_2$ being $C_1-C_2$ lower alkyl; and; optionally, 5. an inorganic salt as sodium chloride or a salt composition such as that of Example I of U.S. Pat. No. 4,471,002; and, optionally, (iv) a non-toxic edible salt other than a phosphate, e.g., sodium chloride; and (c) coating the resulting mixture prepared in (b) onto said first surface and simultaneously causing the mixture of (b) to be in intimate contact with substantially the entirety of said first surface for a period of time sufficient to cause the proteinaceous inner food core to permanently absorb or adsorb the flavor composition and/or flavor precursors from the mixture (b); and, optionally, (d) cooking the resulting coated proteinaceous inner core.

The reaction flavors useful in the practice of our invention include, but are not limited, to those set forth in the following U.S. Patents:

U.S. Pat. No. 4,076,852 issued on Feb. 28, 1978; and
U.S. Pat. No. 4,081,565 issued on Mar. 28, 1978, for example, the reaction product of an enzymatic digest of meat, natural meat, thiamine and cysteine.

The foregoing patents and their disclosures are incorporated herein by reference.

More preferably, the reaction flavor or mixture of reaction flavor precursors useful in the practice of our invention are formed by intimately admixing:

(i) 30-80% of a macerated meat or ground meat (e.g., macerated chicken meat and/or macerated beef taken alone or taken further together with a meat extract such as commerical beef extract)

(ii) 0.1-1.5% of cysteine or a salt thereof (e.g., cysteine hydrochloride);

(iii) 0.2-1.5% thiamine or a salt thereof (e.g., thiamine hydrochloride);

(iv) 2-30% of a polysaccharide, e.g., starch and/or sugar(s) or a reducing sugar metabolite e.g.,, a furanone of the genus:

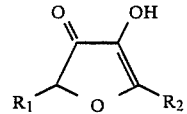

wherein $R_1$ and $R_2$ are the same or different hydrogen or $C_1-C_2$ lower alkyl with at least one of $R_1$ and $R_2$ being $C_1-C_2$ lower alkyl; and; optionally, (v) an inorganic salt e.g., sodium chloride or a salt composition such as that of Example I of U.S. Pat. No. 4,471,002.

The reaction flavor can be made separately, that is, prior to incorporating into the mixture or the reaction flavor precursors can be added to the foregoing mixture prior to incorporation in the marinade. Thus, two alternatives exist; first, the reaction flavor can be prepared as such and second, the reaction flavor precursors are made "in situ" as a result of the carrying out of the marinading process.

In the event that the reaction flavor is to be made separately (as opposed to being made "in situ") then the resulting mixture is heated under the following conditions:

from about 0.5 up to about 5 atmospheres;
from about 80° up to about 170° C.;
for a period of time of from about 0.5 up to about 5 hours with appropriate agitation, e.g., carrying out the mixing using baffles in the reaction vessel.

Examples of the "meat" component (i) of the flavor precursor compositions and the results obtained using same in the practice of our invention are set forth in the following Table I:

TABLE I

| Meat Composition of Flavor | Meat Muscle Tissue To Be Marinated | Intense Flavor Nuance Created As A Result Of Carrying Out The Marination Process Of Our Invention |
| --- | --- | --- |
| Ground Pork Butt | Pork Cutlet | Sausage |
| Ground Sausage Meat | Ground Turkey | Sausage |
| Ground Beef | Turkey Thigh Cubes | Sirloin Tips |
| Canadian Brand Ham | Pork Loin | Canadian Bacon |

The reaction flavor or reaction flavor components (iv) is utilized at a level in the range of from about 0.3% up to about 3% by weight of the overall marinade mixture (containing items (i), (ii), (iii) and, optionally, (iv).

The value from an organoleptic standpoint of the flavor imparted by the aforementioned marinade composition whether using a finally-created flavor from a prior reaction or a mixture of flavor precursors is shown using a "scale flavor preference of a 10 member flavor panel on a scale of 1-10, with a value of 1 being the least favored and a value of 10 being the most favored".

Hence, when used at a level of 0.5%, the flavor "value" (on a scale of 1-10) imparted by the marinade compositions of our invention on the average will have a value of "6" as opposed to the value of a marinade composition using the cysteine-thiamine-hydrolyzed vegetable protein flavor of Example II of U.S. Pat. No. 3,394,016 which flavor has a value of "3".

When used at a level of 1%, the average flavor value imparted by the marinade compositions of our invention has a value three-fold that (9) of a marinade composition using the cysteine-thiamine-hydrolyzed vegetable protein flavor of Example II of U.S. Pat. No. 3,394,016 which has a value of "3".

In all cases the "warmed over" flavor frequently encountered in the meat flavor-food cooking process will be substantially completely "covered" as a result of using the marinade composition of our invention in all cases in the ranges set forth, supra.

Furthermore, the marinade composition of our invention may contain precursors of the thus produced meat flavors as opposed to the meat flavors themselves; or the marinade composition may contain mixtures of precursors and finished food flavors, e.g., a 50:50 weight:-weight mixture of the reaction product of cysteine thiamine and macerated chicken meat taken further together with unreacted cysteine, thiamine and macerated chicken meat; or a reaction product of cysteine, thiamine, enzymatic digest of beef and macerated beef taken together with the individual components; cysteine, thiamine, macerated beef and enzymatic digest of beef.

Any inorganic non-toxic phosphate salt may be used in the practice of our invention, for example, tripotassium phosphate, trisodium phosphate, sodium monoacid phosphate, potassium mono acid phosphate, sodium tripolyphosphate, magnesium phosphate and the like.

In addition to the aforesaid individual phosphates, salt compositions containing such phosphates may be used, for example, the salt compositions exemplified in the following U.S. Patents:

U.S. Pat. No. 4,471,002 issued on Sep. 11, 1984;
U.S. Pat. No. 4,514,431 issued on Apr. 30, 1985; and
U.S. Pat. No. 4,514,094 issued on Apr. 30, 1985.

The foregoing patents are incorporated herein by reference.

The percent of salt (including phosphate), flavor composition and/or flavor precursor composition in water for the marinade composition may vary from about 20% up to about 40% by weight with a preferred range of from about 25% up to about 35% by weight of the liquid marinade composition.

The percent of salt other than phosphate salt may vary from about 10 up to about 25% by weight of the liquid marinade composition. The percentage of phosphate salt in the liquid marinade composition may vary from about 4 up to about 15% by weight of the liquid marinade composition with a preferred range of from about 4.5 up to about 8.0% by weight. The percentage of flavor composition and/or flavor precursor composition in the liquid marinade composition may vary from about 10% by weight of the composition up to about 40% by weight of the composition.

In the practice of our invention, a marinade containing phosphate, preferably salt other than phosphate, and a flavor composition and/or flavor precursor composition is suspended in a uniform slurry. The slurry is added to the desired proteinaceous substance, e.g., meat such as meat muscle tissue; and allowed to absorb by tumbling in a vacuum drum or manually folding in an open drum.

The marination time may vary from about 10 minutes up to about 2 hours depending on other marination conditions. When carried out at atmospheric pressure at 30° C. under turbulent flow conditions (i.e., using a tumbler with baffles) the marination time is from about 1 up to about 2 hours. When carried out in vacuum, e.g., 0.3 atmospheres under turbulent flow conditions, the marination time is from about 10 up to about 30 minutes (at 30° C.).

Proteinaceous substances that can be treated in this manner are beef pieces, cubes, steaks, chops; chicken parts; fish and bean curd.

The muscle meat when it is used is very sponge-like and will absorb the marinade. Thus, the marinade is both absorbed and adsorbed allowing the phosphate salt to increase the water binding properties of the meat tissue, carrying flavor and/or flavor precursor composition into the meat tissue as an effective application.

The meat product can then be blast-chilled, formed and refrozen for storage until end product use.

A second method involves the aforementioned preparation but also involves the pumping of the marinade composition into a meat carcass using a state of the art needle applicator.

Meats flavored using the aforementioned marinade compositions can be microwaved, conventionally baked, fried, deep-fried or otherwise cooked without loss or degradation to the flavor.

Hence, reaction flavors and/or reaction flavor precursors useful in the practice of our invention totally enhance meat products, patties, frozen entrees, microwave dishes, fast food patties and nuggets.

The following examples are illustrative of our invention but our invention is only limited according to the claims set forth, infra.

EXAMPLE I

The following mixture is prepared:

| Ingredients | Parts By Weight |
| --- | --- |
| Water | 79.6% |
| Flavor (produced according to Example XXXIII of U.S. Letters Patent 4,081,565 the disclosure of which is incorporated herein by reference; a reaction product of enzymatic pork meat digest, cysteine hydrochloride and thiamine hydrochloride) | 12.5% |
| Sodium chloride | 6.2% |
| Tripotassium phosphate | 4.4% |

The resulting mixture, at a rate of 8% is injected into a chicken meat carcass. The marinade composition is thoroughly absorbed into the meat and maintained for a period of 1.5 hours.

The resulting product is then cooked at 380° F. and then subjected to a 30 second blast-freeze.

The resulting product has an enhanced and succulent Canadian bacon flavor.

EXAMPLE II

The following mixture is prepared:

| Ingredients | Parts by Weight |
| --- | --- |
| Water | 79.6% |
| Flavor (produced according to Example LX of U.S. Letters Patent 4,076,852 the disclosure of which is incorporated herein by reference; a reaction product of enzymatic egg digest, macerated beef, cysteine hydrochloride and thiamine hydrochloride) | 12.5% |
| Sodium chloride | 6.2% |
| Tripotassium phosphate | 4.4% |

The resulting mixture, at a rate of 8% is injected onto turkey meat cubes. The marinade composition is thoroughly absorbed into the turkey meat cubes and maintained for a period of 1.5 hours.

The resulting product is then cooked at 380° F. and then subjected to a 30 second blast-freeze.

The resulting product has an enhanced and succulent sirloin tips flavor.

EXAMPLE III

The following mixtures for 8% marinades (based upon a weight of 100 grams of chicken) are prepared:

| Ingredients | III (A) (%) Chicken Flavor Marinade | III (B) (%) Typical Ethnic Marinade |
| --- | --- | --- |
| Sodium tripoly- | 0.35 | 0.25 |

-continued

| Ingredients | III (A) (%) Chicken Flavor Marinade | III (B) (%) Typical Ethnic Marinade |
|---|---|---|
| phosphate | | |
| Salt (Sodium Chloride) | 0.50 | — |
| Flavor (reaction product of macerated chicken meat, cysteine-hydrochloride and thiamine hydrochloride) | 1.00 | 3.20 |
| Water | 6.15 | 4.55 |
| TOTAL MARINADE | 8.00 G (For a 92 G Breast) | 8.00 G (For a 92 G Breast) |

The sodium tripolyphosphate is intimately admixed with hot water and dissolved. The sodium chloride and flavor are weighed out and intimately admixed with the sodium tripolyphosphate solution.

A chicken breast is placed in a microwaveable plastic bag. The marinade is added to the breast and massaged into the breast muscle until most of the liquid is absorbed (this takes approximately 5 minutes).

The plastic bag is sealed and placed in a freezer.

The cooking process is as follows: The plastic bag is punctured and the boneless breast is microwaved for approximately 2 minutes on "high" in a 700 watt microwave oven for 3.5 minutes.

The resulting product has an enhanced and succulent chicken teriyaki flavor insofar as both Examples III(A) and III(B) are concerned. The intensity of the chicken teriyaki flavor for Example III(A) on a scale of 1–10 is approximately 9 and the intensity of the chicken teriyaki flavor of Example III(B) on a scale of 1 to 10 is approximately 7.5.

What is claimed is:

1. A process for preparing a marinaded chicken meat product consisting of the steps of:

(a) providing a chicken meat muscle tissue inner food core having an outer surface;
   (b) preparing a marinade mixture comprising:
      (i) an inorganic non-toxic phosphate salt;
      (ii) water; and
      (iii) a reaction product of macerated chicken meat, cysteine hydrochloride and thiamine hydrochloride;
   (c) coating the resulting marinade mixture prepared in (b) onto said outer surface and simultaneously causing the marinade mixture of (b) to be in intimate contact with substantially the entirety of said outer surface for a period of time sufficient to cause said chicken meat muscle tissue inner food core to permanently absorb or adsorb said reaction flavor from the mixture (b); and then
   (d) cooking the resulting chicken meat muscle tissue inner core;

the percent marinade based on the total weight of marinaded chicken meat food product being 8%, the percent inorganic non-toxic phosphate salt based on the weight of marinaded chicken meat product being from 0.25% up to 0.35%; the percent reaction flavor being from 1.00% up to 3.20% based on the total weight of marinaded chicken meat food product; the percent water based on the total weight of marinaded chicken meat food product being from 4.55% up to 6.15%.

2. The process of claim 1 wherein the marinade mixture also contains a non-toxic edible salt other than a phosphate salt in an amount based on the total weight of marinaded chicken meat product of 0.50%.

3. The product produced according to the process of claim 2.

4. The process of claim 1 wherein the inorganic non-toxic phosphate salt is sodium tripolyphosphate.

5. The product produced according to the process of claim 4.

6. The product produced according to the process of claim 1.

7. The process of claim 1 wherein step (d), the cooking step, is carried out in a 700 watt microwave oven.

* * * * *